(12) United States Patent
Mazzurco et al.

(10) Patent No.: US 6,683,891 B1
(45) Date of Patent: Jan. 27, 2004

(54) METHOD AND APPARATUS FOR PASSING CONTROL INFORMATION IN A BIDIRECTIONAL LINE SWITCHED RING CONFIGURATION

(75) Inventors: Anthony Mazzurco, Plano, TX (US); Joseph A. Crossett, III, Richardson, TX (US); Manouchehr Darabpour, Carrollton, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/473,409

(22) Filed: Dec. 27, 1999

(51) Int. Cl.[7] ............................................... H04L 12/28
(52) U.S. Cl. ...................... 370/907; 370/221; 370/222
(58) Field of Search ................................. 370/221, 222, 370/223, 224, 227, 907

(56) References Cited

U.S. PATENT DOCUMENTS 5,341,364 A * 8/1994 Mara et al. ................. 370/16.1
6,144,633 A * 11/2000 Ikeda et al. .................. 370/217
6,317,439 B1 * 11/2001 Cardona et al. ............ 370/503

OTHER PUBLICATIONS

Bellcore, "Sonet BLSR Equipment Generic Criteria Overview of the BLSR Architecture", dated Dec. 3, 1996, pp. 3–13 through 3–24 and 6–16 through 6–20.*

* cited by examiner

Primary Examiner—Douglas Olms
Assistant Examiner—Robert W. Wilson
(74) Attorney, Agent, or Firm—Baker Botts, LLP; Jessica W. Smith; V. Lawrence Sewell

(57) ABSTRACT

A telecommunications network (10) includes a plurality of nodes (12) interconnected in a bidirectional line switched ring configuration (18). The bidirectional line switched ring configuration (18) includes a working communication link (14) and a protection communication link (16) between each of the plurality of nodes (12). A particular node (12) within the telecommunications network (10) includes a first ring port interface (20) and a second ring port interface (22) each coupled to the working communication link (14) and the protection communication link (16). The first ring port interface (20) and the second ring port interface (22) are coupled by a cross connect matrix (24). The particular node (12) may have a protection channel access unit (30) to terminate control information carried over a protection communication link (16) of the bidirectional line switched ring configuration (18). In order to maintain transfer of control information over the bidirectional line switched ring configuration (18), a dedicated matrix connection (34) in the cross connect matrix provides a path to pass control information between the first ring port interface (20) and the second ring port interface (22).

9 Claims, 1 Drawing Sheet

METHOD AND APPARATUS FOR PASSING CONTROL INFORMATION IN A BIDIRECTIONAL LINE SWITCHED RING CONFIGURATION

TECHNICAL FIELD OF THE INVENTION

The present invention relates in general to data transfer in a telecommunications network and more particularly to a method and apparatus for passing control information in a bidirectional line switched ring configuration.

BACKGROUND OF THE INVENTION

In conventional telecommunications networks, service providers have deployed Bidirectional Line Switched Rings (BLSR) to provide a network restoration capability. In a BLSR configuration, a node couples to other nodes in the system by a working communication link and a protection communication link set up in a dual ring topology. Traffic and other information travels around the working communication link and is extracted by a node in response to the node being the desired destination. The protection communication link provides another path to transfer the traffic and other information in the event of a failure in the working communication link between any node in the system. The BLSR configuration provides network survivability for single link failures and allows the network to function in a segmented mode when entire nodes have failed.

One feature that digital cross connect systems bring to the BLSR configuration is that they can act as nodes on the BLSR for passing traffic between east and west ring port interfaces as well as providing the restoration switching function. By means of their cross connect matrices, the digital cross connect systems may provide protection channel access during normal ring operation and ring interconnections.

In order for a BLSR to properly function and monitor the status of all its nodes, two bytes of information, designated K1 and K2, must pass through the protection communication link. By its nature, a digital cross connect system at a node allows east and west ring port interfaces to be connected by its cross connect matrix.

However, in the event that protection channel access is desired at a node, there is no dedicated connectivity through the cross connect matrix between the east and west ring port interfaces to pass the K1/K2 bytes, especially if 100% of the working traffic is dropped at the node. Therefore, it is desirable to be able to pass the K1/K2 and through a node while still providing protection channel access at the node.

SUMMARY OF THE INVENTION

From the foregoing, it may be appreciated by those skilled in the art that a need has arisen for a technique to pass control information in a bidirectional line switched ring configuration while still providing total protection channel access. In accordance with the present invention, a method and apparatus for passing control information in a bidirectional line switched ring configuration are provided which substantially eliminate or reduce disadvantages and problems associated with conventional bidirectional line switched ring topologies.

According to an embodiment of the present invention, there is provided a cross connect system in a telecommunications network that includes a first ring port interface operable to receive and provide traffic information from and to a working communication link and control information from and to a protection communication link of a fiber optic ring. The control information is associated with the traffic information. A first add/drop unit receives traffic information carried on the working communication link from the first ring port interface and destined for the cross connect system. A first protection channel access unit receives control information from and provides control information to the protection communication link through the first ring port interface. A second ring port interface receives and provides traffic information from and to a working communication link and control information from and to a protection communication link of a fiber optic ring. A cross connect matrix passes traffic information and control information between the first add/drop unit and the first ring port interface, between the first protection channel access unit and the first ring port interface, and between the first ring port interface and the second ring port interface. The cross connect matrix provides a dedicated communication path for the control information to pass from the first ring port interface to the second ring port interface.

The present invention provides various technical advantages over conventional bidirectional line switched ring topologies. For example, one technical advantage is to provide a capability to pass control signals when a node has a protection channel access capability. Another technical advantage is to provide an efficient and inexpensive fixed connection for the protection channel through a cross connect matrix. Yet another technical advantage is to avoid creating and deleting connections based on ring activity. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
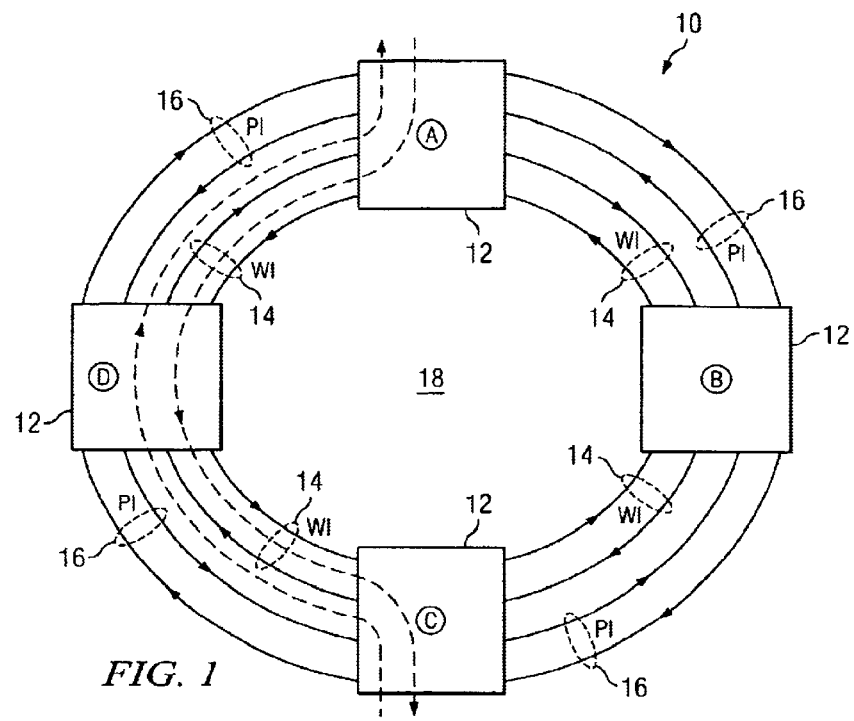
FIG. 1 illustrates a block diagram of a bidirectional line switched ring based telecommunications network.

FIG. 1 is a block diagram of a bidirectional line switched ring based telecommunications network 10. Telecommunications network 10 includes a plurality of nodes 12 interconnected by a working communication link 14 and a protection communication link 16 in a bidirectional line switched ring configuration 18. Information may travel in either direction along both working communication link 12 and protection communication link 14. Working communication link 12 and protection communication link 14 are preferably individual and separate fiber optic rings that transfer information in one direction between nodes 12. For example, four fibers may be included in bidirectional line switched ring configuration 18 such that two fiber handle the respective upstream and downstream flow to and from a particular node 12 as working communication link 14 and the other two fibers handle the respective upstream and downstream information flow to and from the particular node 12 as protection communication link 16. Though the preferred embodiment has been described, working communication link 14 and protection communication link 16 may employ any conventional communication means, including a two fiber bidirectional line switched ring configuration.

The use of bidirectional line switched ring configuration 18 allows for redirecting of information in the event of a cable cut or failure. For example, if a unidirectional span failure occurs on the outbound working communication link 14 from node A to node B, node B detects the failure and initiates a request for protection. The request for protection is transmitted to node A along a short path and a long path. Since it takes longer for the request for protection to reach node A on the long path, protection for a unidirectional failure will most likely involve only the request for protection transmitted on the short path. When the request for protection is received, node A bridges the failed outbound working communication link 14 onto the outbound protection communication link 16 on the same span between nodes A and B. Node A transmits a reverse request for a span switch on the short path and the long path to node B. Node B receives the reverse request for the span switch, performs the span switch, bridges the outbound working communication link 14 onto the outbound protection communication link 16, and transmits the bridged status and the switched status along the short and long paths. Node A receives the bridged and switched indications and completes the switch.

For a bidirectional span failure involving only the inbound and outbound working channel link 14 between nodes A and B, both nodes detect the failure and initiate requests. The result is identical to that of a unidirectional span failure except that both nodes are transmitting identical switch requests. The result is identical because a K1 and K2 byte protocol includes identifying the failure scenarios that can be protected against using only a span switch. The K1 and K2 bytes are part of the overhead and control information associated with traffic carried between nodes 12 and provide ring and span switch status and determine how switching is to be performed within bidirectional line switched ring configuration 18.

If a span switch cannot be completed or a unidirectional or bidirectional failure occurs that affects both working communication link 14 and protection communication link 16 in the same span between nodes, a ring switch is to be performed. Nodes A and B both detect the failure and initiate ring bridge requests. Intermediate nodes pass through the ring bridge requests. When the crossing K1 and K2 bytes are received, nodes A and B perform the bridge and the switch from working communication link 14 to protection communication link 16. Intermediate nodes continue to terminate and insert traffic on working communication link 14. The bridging to protection communication link 16 and the selection from protection communication link 16 is performed by nodes adjacent to the failed span. Intermediate nodes do not terminate traffic from protection communication link 16 when operating in the pass through mode.

Figure 2:
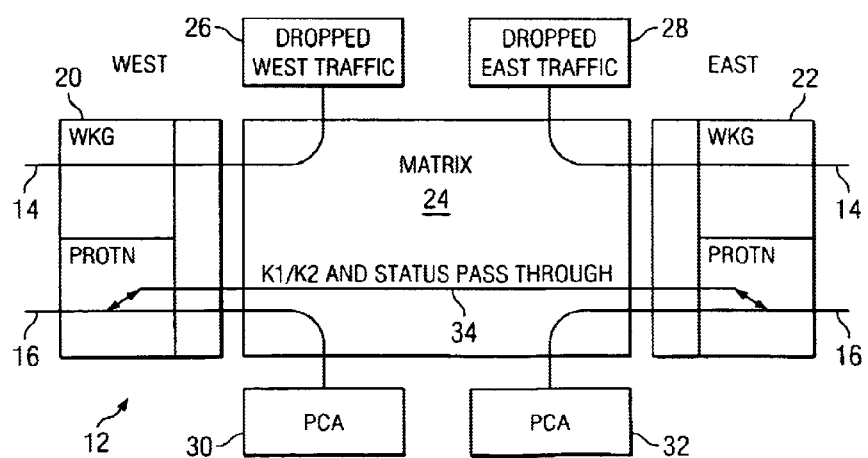
FIG. 2 illustrates a node in the telecommunications network.

FIG. 2 is a block diagram of a node 12 representing a cross connect system. Node 12 includes a first ring port interface 20 coupled to working communication link 14 and protection communication link 16. Node 12 also includes a second ring port interface 22 coupled to working communication link 14 and protection communication link 16. A cross connect matrix 24 having a plurality of inputs and outputs provides a communication path between first ring port interface 20 and second ring port interface 22. Node 12 includes a first add/drop unit 26 that receives and provides traffic information over working communication link 14 through cross connect matrix 24 and first ring port interface 20. A second add/drop unit 28 receives and provides traffic information over working communication link 14 through cross connect matrix 24 and second ring port interface 22. Node 12 includes a first protection channel access unit 30 that receives and provides interruptable control information over protection communication link 16 through cross connect matrix 24 and first ring port interface 20. A second protection channel access unit 32 receives and provides interruptable control information over protection communication link 16 through cross connect matrix 24 and second ring port interface 22.

With protection channel access capability, node 12 has no connectivity through cross connect matrix 24 for control information, particularly K1/K2 bytes for ring and span switch determinations, on protection communication link 16 to be passed onto other nodes in telecommunications network 10. If 100% of the traffic information is dropped at first add/drop unit 26 and second add/drop unit 28, there is no connectivity whatsoever between first ring port interface 20 and second ring port interface 22. In order to provide a control information pass through for protection communication link 16 within node 12, a dedicated matrix connection 34 is established in cross connect matrix 24. Dedicated matrix connection 34 couples into protection communication link 16 at first ring port interface 20 and second ring port interface 22.

Dedicated matrix connection 34 provides fixed and dedicated protection channel connections through cross connect matrix 24 in order that the K1/K2 bytes can pass from node to node regardless of how much traffic is dropped or if protection channel access is present. Connections within cross connect matrix 24 do not have to be created or deleted based upon ring activity. All protection switching could now be handled exclusively in the ring port interfaces 20 and 22. The ring port interfaces 20 and 22 and cross connect matrix 24 can be placed in different physical line shelves and geographically remote from one another to provide greater system development flexibility.

Thus, it is apparent that there has been provided, in accordance with the present invention, a method and apparatus for passing control information in a bidirectional line switched ring configuration that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A cross connect system in a bidirectional line switched ring network, comprising:
   a first ring port interface coupled to a first working communication link and to a fist protection communication link of a fiber optic ring;
   a first protection channel access unit operable to terminate all channels received on the first protection communication link;
   a second ring port interface coupled to a second working communication link and to a second protection communication link of the fiber optic ring;
   a second protection channel access unit operable to terminate all channels received on the second protection communication link of the fiber optic ring; and
   a cross connect matrix for providing communication paths between the first and second ring port interfaces, wherein the cross connect matrix is configured to provide a dedicated communication path to pass control information between the first protection communication link coupled to the first ring port interface and the second protection communication link coupled to the second ring port interface when all the channels on the first and second protection communication links have been dropped by the first and second protection channel access units.

2. The cross connect system of claim 1, wherein the control information includes K1 and K2 bytes.

3. The cross connect system of claim 1, wherein the first ring port interface and the second ring port interface are not physically co-located.

4. The cross connect system of claim 1, further comprising:

a first add/drop unit operable to receive traffic information carried on the first working communication link from the first ring port interface and destined for the cross connect system; and a second add/drop unit operable to receive traffic information carried on the second working communication link from the second ring port interface and destined for the cross connect system.

5. A method for passing control information in a cross connect system with protection channel access in a bidirection line switched ring network, comprising:

at a first interface unit coupled to the ring network, receiving and transmitting working channels over a first working link and protection channels over a first protection link, at a second network interface unit coupled to the ring network, receiving and transmitting working channels over a second working link and protection channels over a second protection link;

terminating protection channels received over the first protection link at a protection channel access unit;

terminating protection channels received over the second protection link at a second protection channel access unit; and passing through control information received from the first protection link to the second transmission link over a dedicated communication path through a cross connect matrix when all the protect channels associated with the first interface unit and second network interface unit have been dropped.

6. The method of claim 5, wherein the control information includes K1 and K2 bytes.

7. A bidirectional line switched ring network, comprising:

a working communication ring that transmits working channels around the ring network;

a protection communication ring that transmit protect channels around the ring network;

a plurality of nodes interconnected by the working communication ring and the protection communication ring, wherein each of the plurality of nodes includes:

a first ring port interface coupled to the working communication ring and to the protection communication ring for receiving and transmitting traffic to and from a first direction of the ring network;

a first protection channel access unit operable to terminate all protect channels received at the first ring port interface;

a second ring port interface coupled to the working communication ring and to the protection communication ring for receiving and transmitting traffic to and from a second direction of the ring network;

a second protection channel access unit operable to terminate all protect channels received at the second ring port interface; and a cross connect matrix for switching working and protect channels between the first and second ring port interfaces, wherein the cross connect matrix is configured to provide a dedicated communication path to pass control information between the first ring port interface and the second ring port interface when all the protect channels from the first and second protection communication rings have been dropped by the first and second protection channel access units.

8. The cross connect system of claim 7, wherein the control information includes K1 and K2 bytes.

9. The cross connect system of claim 7, wherein the first ring port interface and the second ring port interface are not physically co-located.

* * * * *